(12) United States Patent
Deroo et al.

(10) Patent No.: US 11,430,411 B2
(45) Date of Patent: Aug. 30, 2022

(54) CONTENT SHARING PROTOCOL

(71) Applicant: BARCO NV, Kortrijk (BE)

(72) Inventors: Danny Deroo, Wevelgem (BE); Lode De Paepe, Ghent (BE)

(73) Assignee: BARCO NV, Kortrijk (BE)

( * ) Notice: Subject to any disclaimer, the term of this patent is extended or adjusted under 35 U.S.C. 154(b) by 22 days.

(21) Appl. No.: 15/778,671

(22) PCT Filed: Jul. 7, 2016

(86) PCT No.: PCT/EP2016/066211
§ 371 (c)(1),
(2) Date: May 24, 2018

(87) PCT Pub. No.: WO2017/088991
PCT Pub. Date: Jun. 1, 2017

(65) Prior Publication Data
US 2018/0357982 A1    Dec. 13, 2018

(30) Foreign Application Priority Data

Nov. 26, 2015 (GB) ..................................... 1520864
Nov. 27, 2015 (GB) ..................................... 1520948

(51) Int. Cl.
*G09G 5/14*    (2006.01)
*G06F 3/14*    (2006.01)

(52) U.S. Cl.
CPC ............. *G09G 5/14* (2013.01); *G06F 3/1454* (2013.01); *G09G 2340/145* (2013.01); *G09G 2354/00* (2013.01); *G09G 2380/08* (2013.01)

(58) Field of Classification Search
CPC ....... G09G 5/14; G06F 3/1454; G06F 3/1431; G06F 3/1423; G06F 9/452; H04L 65/605; H04L 65/4038; H04L 65/1086
(Continued)

(56) References Cited

U.S. PATENT DOCUMENTS 6,611,277 B1 *  8/2003  Miyazaki .............. G06F 3/0482
                                                      715/861
6,677,979 B1 *  1/2004  Westfield ................. H04N 7/15
                                                      348/14.08
(Continued)

FOREIGN PATENT DOCUMENTS

CN    102065267 A    5/2011
CN    102804161 A   11/2012
(Continued)

OTHER PUBLICATIONS

European Office Action in corresponding European Application No. 16741564.5-1210, dated Aug. 12, 2019.
(Continued)

*Primary Examiner* — Fred Tzeng
(74) *Attorney, Agent, or Firm* — Hamre, Schumann, Mueller & Larson, P.C.

(57) ABSTRACT

A method for sharing content between one host display and at least one associated display, each display having an image area, the method including for each associated display, the host display receiving the resolution of an image area of the associated display and defining a sharing area on the host display having the same resolution, and displaying the unscaled content in the sharing area of the host display on the image area of the associated display.

21 Claims, 10 Drawing Sheets

(58) Field of Classification Search
USPC .................................................... 345/2
See application file for complete search history.

(56) References Cited

U.S. PATENT DOCUMENTS

| | | | |
|---|---|---|---|
| 8,004,540 B1 | 8/2011 | Munter et al. | |
| 8,725,801 B2* | 5/2014 | Kariathungal | G06F 19/321 709/204 |
| 8,823,602 B2* | 9/2014 | Yada | H04L 12/1827 345/1.2 |
| 9,342,267 B2* | 5/2016 | Huang | G06F 3/1462 |
| 9,516,267 B2* | 12/2016 | Wang | H04L 65/1086 |
| 9,760,331 B2* | 9/2017 | Lee | G06F 3/14 |
| 10,044,979 B2* | 8/2018 | Ouyang | H04L 65/4015 |
| 10,075,492 B2* | 9/2018 | Kawakubo | H04L 65/4038 |
| 10,313,426 B2* | 6/2019 | Kim | H04L 67/10 |
| 2004/0064510 A1* | 4/2004 | Ooi | H04L 12/1822 709/205 |
| 2004/0263424 A1 | 12/2004 | Okuley | |
| 2006/0136828 A1* | 6/2006 | Asano | G06F 3/1454 715/733 |
| 2007/0011316 A1* | 1/2007 | Araki | G06Q 10/10 709/224 |
| 2008/0036693 A1 | 2/2008 | Driver et al. | |
| 2010/0094728 A1* | 4/2010 | Denning | G06Q 30/02 705/26.1 |
| 2013/0238684 A1* | 9/2013 | Patil | G06F 9/452 709/203 |
| 2014/0223490 A1* | 8/2014 | Pan | H04N 21/42224 725/61 |
| 2014/0240440 A1* | 8/2014 | Seo | H04L 51/04 348/14.03 |
| 2015/0128068 A1* | 5/2015 | Kim | G06Q 10/107 715/752 |
| 2015/0128069 A1* | 5/2015 | Ouyang | H04L 65/605 715/753 |
| 2015/0160913 A1* | 6/2015 | Lee | G06F 3/1454 345/2.2 |
| 2015/0207878 A1* | 7/2015 | Cuzzort | H04N 7/14 345/2.2 |
| 2015/0317120 A1* | 11/2015 | Kim | G06F 3/1431 345/1.3 |
| 2015/0324536 A1* | 11/2015 | Shie | G06Q 50/24 715/753 |
| 2015/0347077 A1* | 12/2015 | Kataoka | G06F 3/1431 345/1.1 |
| 2015/0356949 A1* | 12/2015 | Kim | H04W 4/21 345/173 |
| 2016/0210101 A1* | 7/2016 | Moriwaki | G06F 3/1423 |
| 2016/0328114 A1* | 11/2016 | Santhakumar | G06F 3/0481 |
| 2017/0104040 A1* | 4/2017 | Huangfu | G09G 3/2003 |

FOREIGN PATENT DOCUMENTS

| | | |
|---|---|---|
| CN | 103931176 A | 7/2014 |
| EP | 2857957 A1 | 4/2015 |

OTHER PUBLICATIONS

International Search Report and Written Opinion in PCT/EP2016/066211, dated Nov. 30, 2016.
International Preliminary Report on Patentability in PCT/EP2016/066211, dated Feb. 13, 2018.
Examination Report under Section 18(3) in GB 1520948.9, dated Nov. 28, 2016.
Office Action cited in correspondent Chinese patent application No. 201680078731.5, dated Jan. 12, 2021, with English translation, 29 pages provided.
Office Action issued in corresponding Chinese Application No. 201680078731.5, dated Jan. 21, 2022, with machine translation.

* cited by examiner

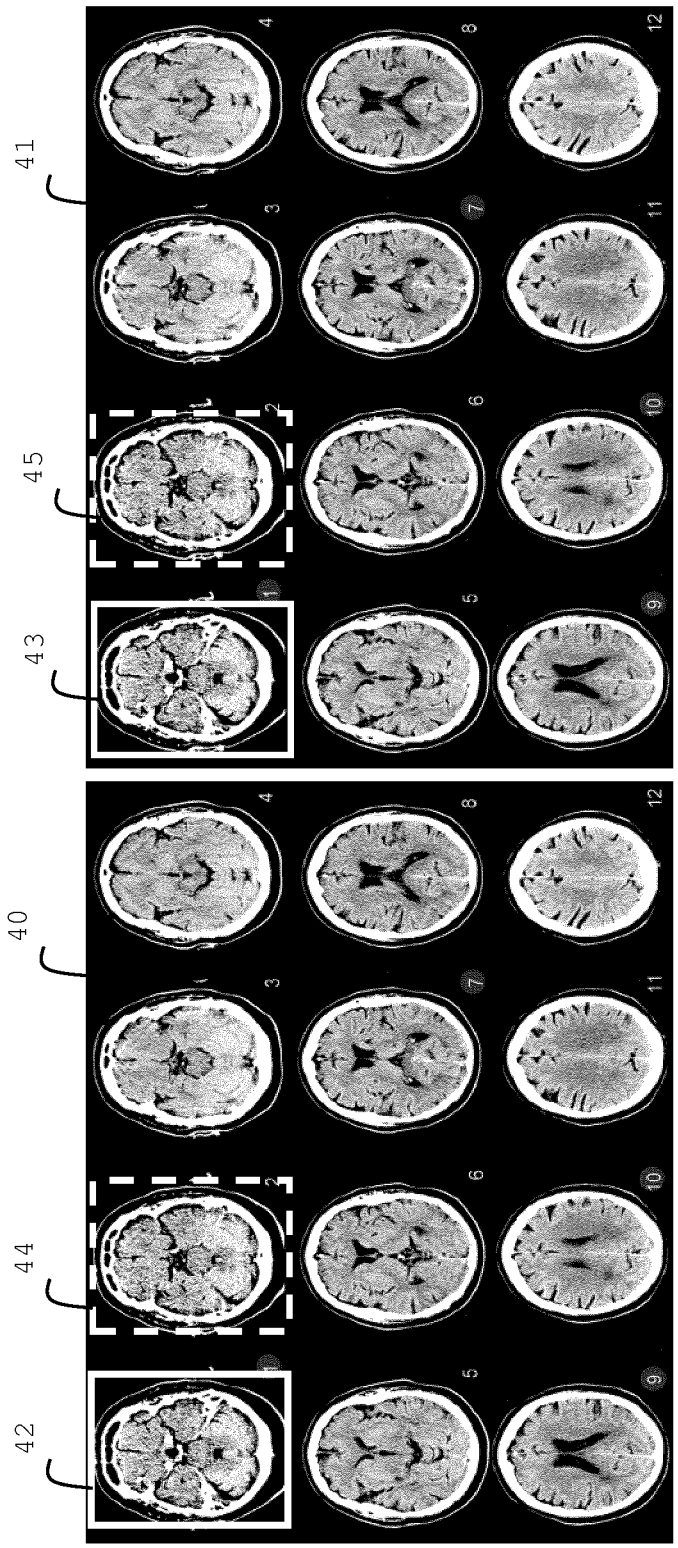
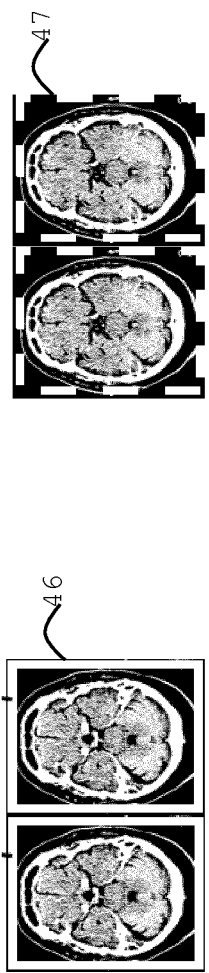
Figure 5

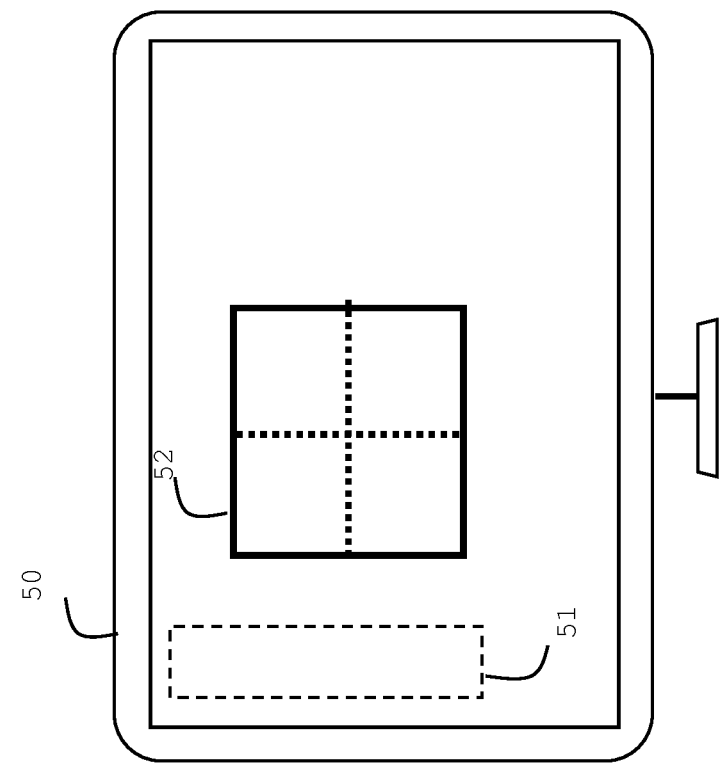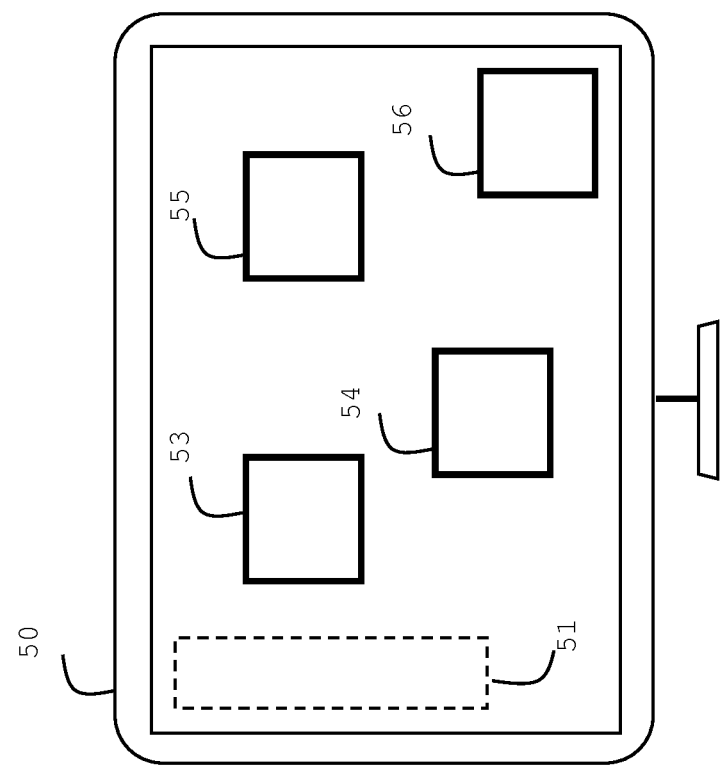
Figure 6

CONTENT SHARING PROTOCOL

The present invention relates to a method and system for sharing high-resolution content to low-resolution displays and to display said content in full resolution to displays adapted to share, and to software for carrying out the method.

BACKGROUND

There is an increasing interest in how to share content between displays, or display monitors, with different capabilities. This can for example comprise sharing a high-resolution image on a high-resolution display to a device with a display having lower resolution, for example a mobile phone. The conventional solution is to downscale the image to fit the lower resolution display. If the display is small (e.g. a mobile phone display) the downscaled image can get quite small making it difficult for the user to see all details. Or even worse, the scaling could result in actual information loss. For e.g. reading a newspaper article, this is normally not an issue. There are however several use cases that require more accurate reproduction of the original content, for example high quality remote desktop; control rooms using SCADA (Supervisory Control And Data Acquisition); quantitative imaging; medical imaging.

In the field of healthcare, collaboration tools are already being used in healthcare facilities for regular meetings, remote sessions, etc. Specific TelePresence- and hardware tools are installed for these purposes. However, when it comes to content sharing with multiple users, there is currently no satisfying means for taking care of the medical viewing aspects of the images shared. Remote consulting is mostly conducted as follows: A consulting doctor works remote and calls the radiologist on duty for discussing a case. The radiologist accesses the EMR (Electronic Medical Record) report and image from remote, through e.g. Citrix or a web viewer. The remote doctor informs the radiologist on the patient, report and image of the present case. The radiologist searches and opens the material in his PACS (Picture Archiving and Communication System) viewer and discusses the case with the remote doctor. In this situation, the remote doctor accesses reports and images through the EMR software and/or web viewer, and the radiologist uses the dedicated PACS viewer (a PACS viewer is a certified software for diagnostic viewing). Through the 'phone they communicate the patient name, report references and images like " . . . look at series 2, image 44 . . . ". This way of working enhances the risk of mistakes and overall it is not efficient.

If the two users above would use common collaboration tools (for example Skype, Lync . . . ) the typical situation could be depicted by FIG. 1. A radiologist uses a peripheral screen 1 for the EMR info and some clinical information, and a high-resolution screen 2 for medical images. The remote doctor uses a tablet 3. The radiologist can for example select to share the content of both screens 1 and 2 with tablet 3 of the remote doctor. The tablet 3 has smaller resolution and for example another form factor (portrait mode tablet) than the screens 1 and 2. The shared screens appear on the remote tablet 3 as scaled down images with lower quality where it can be difficult to see details.

Another solution comprises sharing a URL between users looking at the same content. Some applications like Agfa Impax Agility (PACS viewer client) contain a chat window where a URL can be sent to the remote user. The remote user opens this URL and sees the exact same content as the radiologist, however the content is scaled down to fit the screen of the remote user.

Specific collaboration platforms for healthcare applications like Image over the globe (http://www.ioverglobe.com/) implement specific problematic workflows through sharing images in the cloud and support optimized one to one collaboration sessions. Image Over Globe is a global medical image transfer solution which is said to allow instant image access for remotely located physicians. It is said to meet the need of quick DICOM image access in cases when medical professional is not onsite. Images are transferred directly from the diagnostic imaging device or PACS to remote mobile phone, tablet or desktop devices. Specific annotation tools and healthcare technology specific viewers provide generic collaboration tools. However there is no function enabling easy access of a high-resolution image on a low-resolution display.

SUMMARY OF THE INVENTION

It is an objective of the present invention to provide a method and system and displays to enable sharing of at least parts of full resolution images between displays with different resolutions. An advantage of embodiments of the present invention is that this sharing can be done in an easy way.

Embodiments of the present invention can be included in telemedicine or telepresence sessions.

In one embodiment of the invention there is provided a method for sharing content between a host display an at least one associated display, each display having an image area, the method comprising for each associated display:

the host display receiving the resolution of the image area of the associated display and defining a sharing area on the host display having the same resolution, and displaying the unscaled content in the sharing area of the host display on the image area of the associated display.

The method makes it possible for the users of the displays to simultaneously look at a part of the uncompressed image in full resolution.

In one embodiment, the method comprises for at least one associated display, making the corresponding sharing area on the host display equal to one sub-area of the associated display or dividing the corresponding sharing area on the host display into sharing sub-areas where the total area of all sharing sub-areas equals the image area of the associated display.

This makes it possible for the host display user to simultaneously share several regions to one or more associated displays.

In one embodiment, the method comprises for at least one associated display, making corresponding sharing areas of a plurality of host displays into sharing sub-areas of the at least one associated display wherein the total area of all the sharing sub-areas equals the image area of the associated display.

This makes it possible for several host display users to simultaneously share several regions to one or more associated displays.

In one embodiment, the method comprises adding a sharing border to each sharing area to indicate to which associated display the sharing area refers to. Further in one embodiment the display area of at least one associated display can receive a thumbnail of the display area of the host display, or a thumbnail of the display area of the host display and a thumbnail of the display area of at least one other associated display.

This makes it easier for the users to know what the other displays are showing.

In one embodiment the method comprises moving or altering a sharing area being located outside or inside a thumbnail on any display. The moving or altering can comprise grabbing a sharing border with a pointer and move it over the screen or scale it, or pushing a sharing border with the pointer in a certain direction.

This makes it possible to move or alter the sharing area from any display.

In one embodiment, the method comprises positioning the sharing sub-areas immediately adjacent to each other on the corresponding associated display.

This makes it possible for the host display to simultaneously share several regions to one or more associated displays. In another embodiment, the method comprises positioning the sharing sub-areas at arbitrary positions on the host display area.

This has the advantage that any parts of the host image can be easily compared.

In another embodiment, the method comprises allocating a control area on for control functions on the display area of the host display and also on at least one associated display, and using the control areas for sharing at least one control function of the host display with the at least one associated display.

This brings the advantage that the shared content can be partly or fully managed by controls from any display in the sharing session.

In another embodiment, the method comprises arranging the content of the host display in a predefined layout.

In another embodiment the method comprises launching the sharing session and automatically arranging the at least one sharing area and/or the control area of the host display according to predefined layout or in one or more sub-set(s) of the predefined layout By using predefined layouts the positioning of the sharing- and/or control area(s) on the host display can be automatized. The sharing- and/or control area(s) can be positioned to correspond with only one of a plurality images such as a sub-set of one of the predefined layouts. For example, a sharing area could have N images and a sharing area could coincide with less than N images down to just one image, for example one image of a layout having 2×2 images. It can also be beneficial to use layouts the users are accustomed to. This increases efficiency for the users.

In another embodiment, the method comprises locking at least two selected sharing sub-areas on the host display relative to each other and moving them synchronized, and showing their contents side by side on the corresponding associated display.

If there are for example two sequences of images with a systematic difference (for example point in time for recording) so that picture number x in the first sequence differs with the systematic difference to picture number x in the second sequence, the sequences can be put side by side on the host display and the host display can be adapted to allow user input so that the user can easily step through the sequence. The comparison can then be shown on any associated display.

In another embodiment, the method comprises giving input to the display area of any display, to alter any sharing or control area, for example to split a sharing area or to merge at least two sharing sub-areas or to scale a sharing or control area, or add labels or annotations to the shared content, or any combinations hereof, and updating the outcome to all other displays. The displays can be adapted to allow users to add their personalized pointer to the shared areas, for example by adding colour and/or a label for each user.

This has the advantage that any user in the sharing session can alter the shared content. With personalized pointers it is possible to see who is working on the shared area.

In another embodiment, the method comprises representing one pixel on the host display by two or more pixels on the associated display.

This is useful in case the associated display has a higher pixel pitch and the unscaled host image would become very small on the associated display. This upscaling makes it easier for the user of the associated display to see details.

In another embodiment of the invention there is a system provided for sharing content between a host display an at least one associated display, each display comprising an image area with a resolution, wherein for each associated display, the host display comprises a sharing area with the same resolution as the image area of the associated display, and the unscaled content in the sharing area of the host display is displayed on the image area of the associated display. Each sharing area can further have a sharing border that indicates to which associated display it refers to.

The system makes it possible for the users of the displays to simultaneously look at a part of the image in full resolution and also knowing what part of the image is being shared.

In another embodiment, each sharing area has a sharing border, indicating to which associated display it refers to. Further in one embodiment, the display area of at least one associated display comprising a thumbnail of the display area of the host display, or a thumbnail of the display area of the host display and a thumbnail of the display area of at least one other associated display.

This makes it easier for the users to know what the other displays are showing.

In another embodiment, the system comprises for at least one associated display, the corresponding sharing area on the host display being equal to one sub-area of the associated display or dividing the corresponding sharing area, or the corresponding sharing area on the host display being divided into sub-areas so that the total area of all sub-areas equals the image area of the associated display.

This makes it possible for the host display to simultaneously share several regions to one or more associated displays.

In one embodiment, the system comprises for at least one associated display, the corresponding sharing area on the host display being equal to one sub-area of the associated display or he corresponding sharing area on the host display being divided into sharing sub-areas wherein the total area of the one or all sharing sub-areas equals the image area of the associated display.

In another embodiment, the system comprises the sharing sub-areas being immediately adjacent to each other on the corresponding associated displays. In another embodiment, the system comprises the sharing sub-areas being positioned at arbitrary positions on the host display area.

This has the advantage that any parts of the host image can be easily compared.

In another embodiment, the system comprises a control area for control functions being allocated on the display area of the host display and on at least one associated display, and the control functions of the host display is being shared to the control area of the at least one associated display.

This brings the advantage that the shared content can be partly or fully managed by controls from any display in the sharing session In another embodiment, the method comprises arranging the content of the host display in a predefined layout.

By using predefined layouts the positioning of the sharing areas on the host display can be automated. It can also be beneficial to use layouts the users are accustomed to. This increases efficiency for the users.

In another embodiment, the system comprises at least two selected sharing sub-areas on the host display are locked relative to each other for different positions on the display area, and for each position their corresponding contents are shown side by side on the corresponding associated display.

If there are for example two sequences of images with a systematic difference (for example point in time for recording) so that picture number x in the first sequence differs with the systematic difference to picture number x in the second sequence, the sequences can be put side by side on the host display and the user can easily step through the sequence. The comparison can then be shown on any associated display. This increases efficiency for the users.

In another embodiment, the system comprises user added labels or annotations or user specific pointers, or any combination thereof.

This has the advantage that any user in the sharing session can alter the shared content. With personalized pointers it is possible to see who is working on the shared area.

In another embodiment, the system comprises one pixel on the host display being represented by two or more pixels on the associated display.

This is useful in case the associated display has a higher pixel pitch and the unscaled host image would become very small on the associated display. This upscaling makes it easier for the user of the associated display to see details.

In another embodiment, the system comprises the host display or the at least one associated display has the higher resolution.

The host display is not necessarily the one with highest resolution.

In another embodiment, the system comprises a host display that is distributed over two physical display monitors.

This has the advantage that images recorded by different healthcare technology can be put on separate display monitors and used in the same session.

In another embodiment, the system comprises that any display area can be implemented on a high-resolution display monitor, for example a medical diagnostic display or a medical reviewing display or a pathology viewer.

In another embodiment, the system comprises that any display area can be implemented on a low-resolution display monitor, for example a tablet, a mobile phone, a laptop or a projector.

The present invention also provides a computer program product, which when executed on a processing engine executes any of the methods of the invention.

The computer program can be stored on a non-transitory signal storage medium such as an optical disk (CD-ROM or DVD-ROM), a magnetic disk, a solid state memory such as a flash memory or similar.

BRIEF DESCRIPTION OF DRAWINGS

FIG. 3a) shows examples of a collection of different layouts each of which is an embodiment of the present invention. FIG. 3b) shows a layout that has been implemented onto a display. FIG. 3c) shows a control area that has been put on a separate display.

In FIG. 4a), two sharing areas are indicated on a display and the corresponding content is shared unscaled to another display. In FIG. 4b) the sharing area is replaced by a sharing area at another position.

FIG. 5 shows an embodiment of the present invention comprising a sequence of images.

FIG. 6 shows embodiments of the present invention comprising splitting and merging sharing areas. In FIG. 6a) the sharing area of a display is split into subareas. In FIG. 6b) the subareas are merged into one area.

DEFINITIONS

Figure 1:
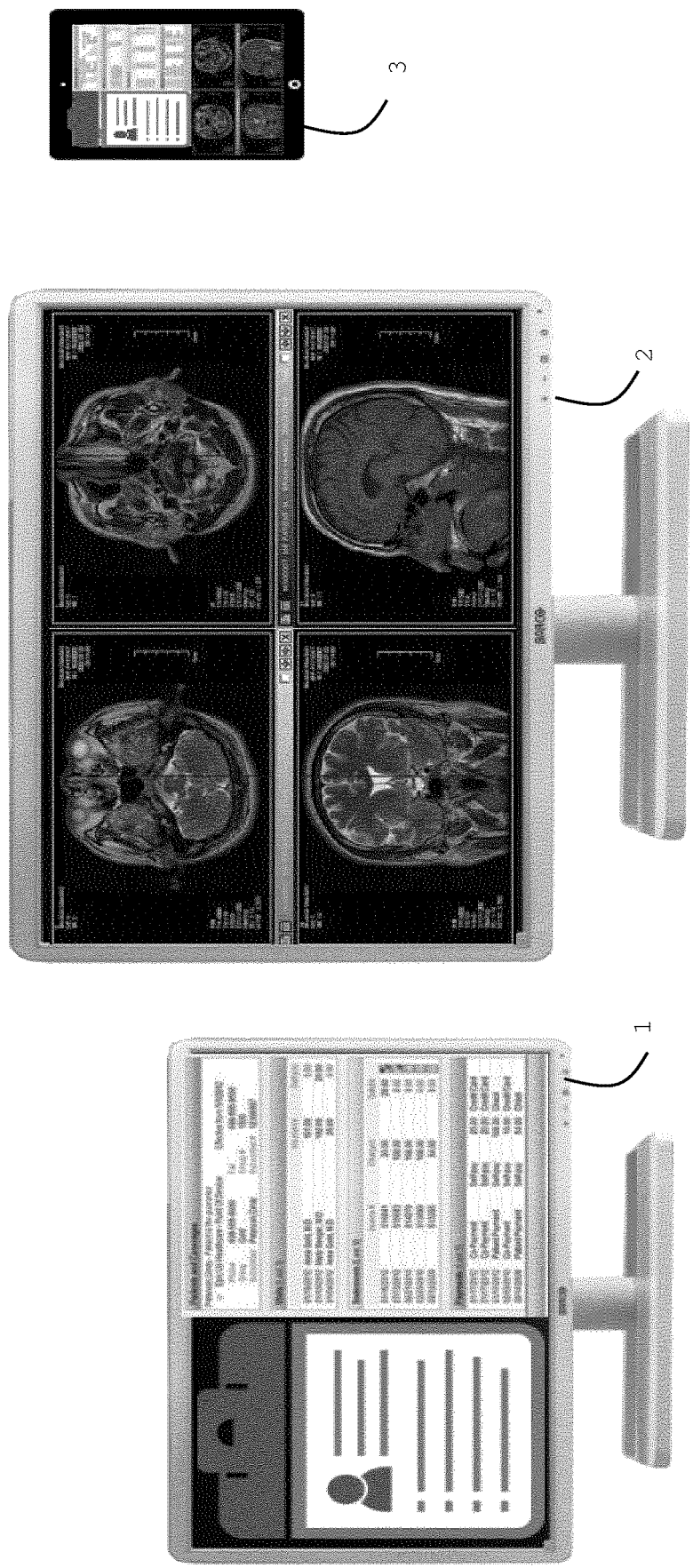
FIG. 1 shows an example of prior-art where the content of two displays are shared to a tablet.

"Display" or "display device"=a display or a display monitor having a display screen large enough for comfortable viewing, e.g. at least 12.5 cm (5 inch) on the diagonal. A display device may comprise logic encoded in media for performing any step of the steps of the methods according to the present invention. Logic may comprise software encoded in a disk or other computer-readable medium and/or instructions encoded in an application specific integrated circuit (ASIC), field programmable gate array (FPGA), or other processor or hardware. A display device can also include a CPU and/a GPU and memory, the CPU and/or GPU having a processing engine able to execute software of the present invention. Hence, display device can include a bus system for communications between random access memory, non-volatile memory, frame grabbers and buffers, processing engine, I/O ports such as a serial port of which USB is one example, network interface for cable connection or wireless connection to a telecommunications network such as a Local Area Network or a wide area data network such as the Internet. The display device can have data inputting units such as a keyboard, or a touchscreen as well as a pointing device such as a "mouse". The display device can be particularly adapted to display of images and may include hardware and/or software graphic accelerators. A display device may also include one or more control units to regulate contrast, gamma, white point, or other display parameters. For a display capable of defining a sharing area, the display may include dedicated buffers adapted to store the image data for display of an unscaled content in the sharing area of the display.

"Display area"=the area in which an image can be displayed, for example, the area of all pixels on a device available for displaying content.

"Image area"=part of the display area available for displaying image content.

"Control area"=part of the display area available for displaying control functions.

"Associated display"=any display device connected to the sharing session that is not the host display.

"Host display"=a display device capable of receiving a resolution of an image area, e.g. of an associated display, and capable of defining a sharing area on the host display having the same resolution and being adapted to display an unscaled content in the sharing area of the host display.

"Sharing session"=at least one host display and one associated display sharing image content, e.g. over a network.

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

Figure 2:
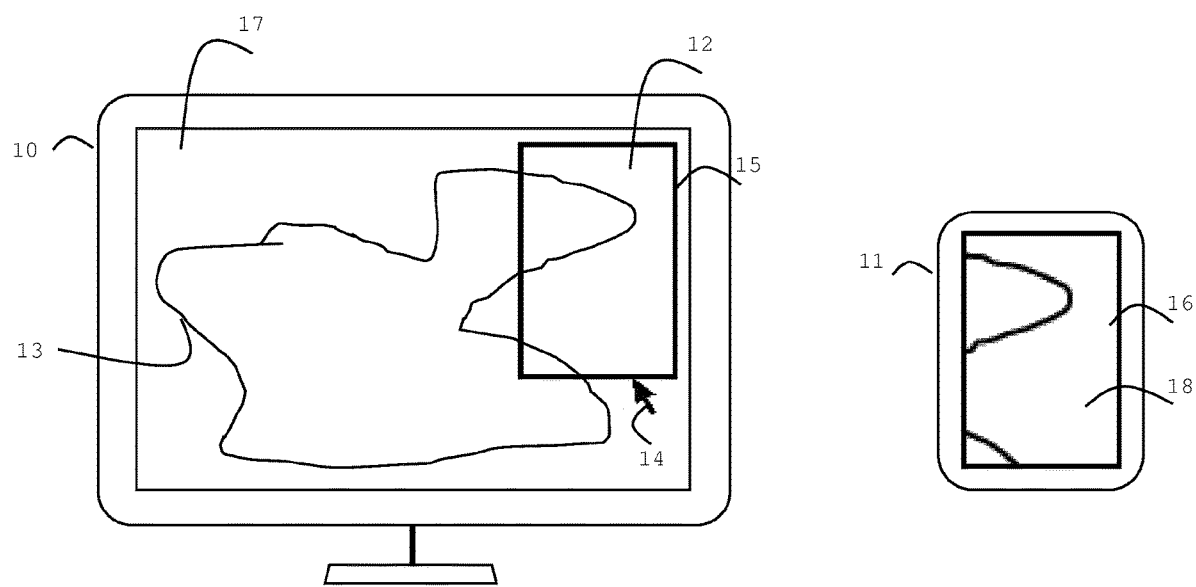
FIG. 2 shows an embodiment of the present invention comprising sharing an image in full resolution.

The present invention provides a method and system for easily sharing images with a higher or high-resolution between display devices with a different, e.g. lower resolution. In one embodiment there is a high-resolution image displayed on a high-resolution display screen that should be shared with a display device having a low-resolution display screen, e.g. a tablet. FIG. 2 shows an embodiment where a high-resolution display 10 having an image area 17 for displaying a higher or a high-resolution image 13 is able to at least partly share this image 13 with a tablet 11 having lower resolution than 10. Embodiments of the invention provide a method comprising the steps of assessing the resolution of an image area such as the tablet image area 18 e.g. of a lower resolution and launching a sharing area 12, optionally limited by a sharing border 15, on the display 10 having, e.g. a higher resolution. The sharing area 12 is chosen so that it has the resolution of the tablet image area 18 or optionally a lower resolution. Then content within the sharing area 12 can be shared unscaled to the tablet image area 18. Thus, if the image is shown in full resolution on display 10, the sharing area will be shown in full resolution on the tablet 11. There can also optionally be a sharing border 16 shown on the tablet 11 to indicate that the content is shared. Embodiments of the invention provide a system adapted to assess the resolution of a lower resolution image area such as a tablet image area 18 and to launch a sharing area 12, optionally limited by a sharing border 15, on the higher resolution display 10. The sharing area 12 has the resolution of the tablet image area 18 or a lower resolution. The system is also adapted to share content within the sharing area 12 unscaled to the tablet image area 18. The system can also be adapted to provide a sharing border 16 shown on the tablet 11 to indicate that the content is shared.

According to the method or the system the sharing area 12 can now be moved around e.g., with pointer 14, and the corresponding content will preferably be continuously updated and shared to the tablet 11. If the both displays have the same pixel pitch, i.e. the distance between the centres of closest adjacent pixels, the images will also have the same size. In this way the users can be sure they are looking at the same part of the image. After the initial step of sharing the unscaled image it is possible to lock the unscaled relationship. It is also possible to scale the shared image, either from the high-resolution display by resizing the sharing border 15 or from the tablet by resizing the sharing border 16. The change is preferably simultaneously updated to the other device.

The tablet 11 can be in the same physical room or in a remote location. The tablet 11 can be replaced with e.g. a mobile phone, a laptop, another medical display screen or a projector or any other type of device having a display screen or a means to display.

Figure 3:
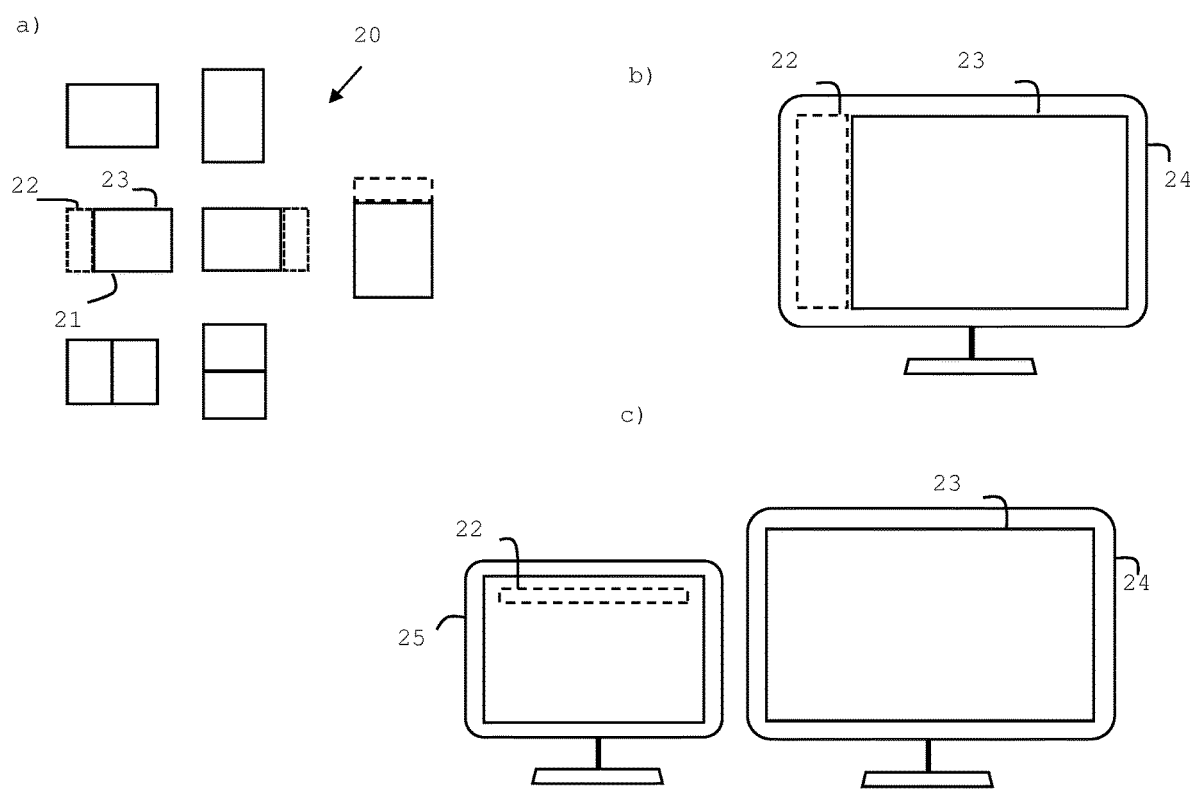
FIG. 3 shows embodiments of the present invention comprising different predefined layouts.

In the field of healthcare image viewing, the DICOM (Digital Imaging and Communications in Medicine) standard defines predefined layouts, or "hanging protocols", and "presentation states" A typical predefined layout, or hanging protocol, is used to visualize multiple medical images, e.g. N images, originating from the way physical films were hung on a light box. These are normally specific for a healthcare technology and can also be user specific. A presentation state defines how an image is shown on the screen, e.g. the window level (a known factor in healthcare), zooming factor etc. Embodiments of the present invention can provide different pre-defined layouts. FIG. 3a) shows examples of a collection of different layouts 20 each of which is an embodiment of the present invention. One layout 21 comprises a control area 22 and an image area 23. In FIG. 3b) the layout has been implemented onto display 24. The control area 22 comprises menus, toolbars and other functions for using the application. The image area is the area (collection of pixels) available for displaying the content, e.g. a high-resolution image. In FIG. 3c) the control area 22 has been put on a separate display 25 in order to free up space for the image area 23. The associated display can also have part of the screen allocated for control area. Thus, the image area can coincide with the display area, as some of the examples in FIG. 20a) suggests.

One embodiment of the present invention relates to an associated display being adapted so that the user of the associated display may choose a layout, and the system then automatically choosing the position of the control and image area on the host display.

Figure 4:
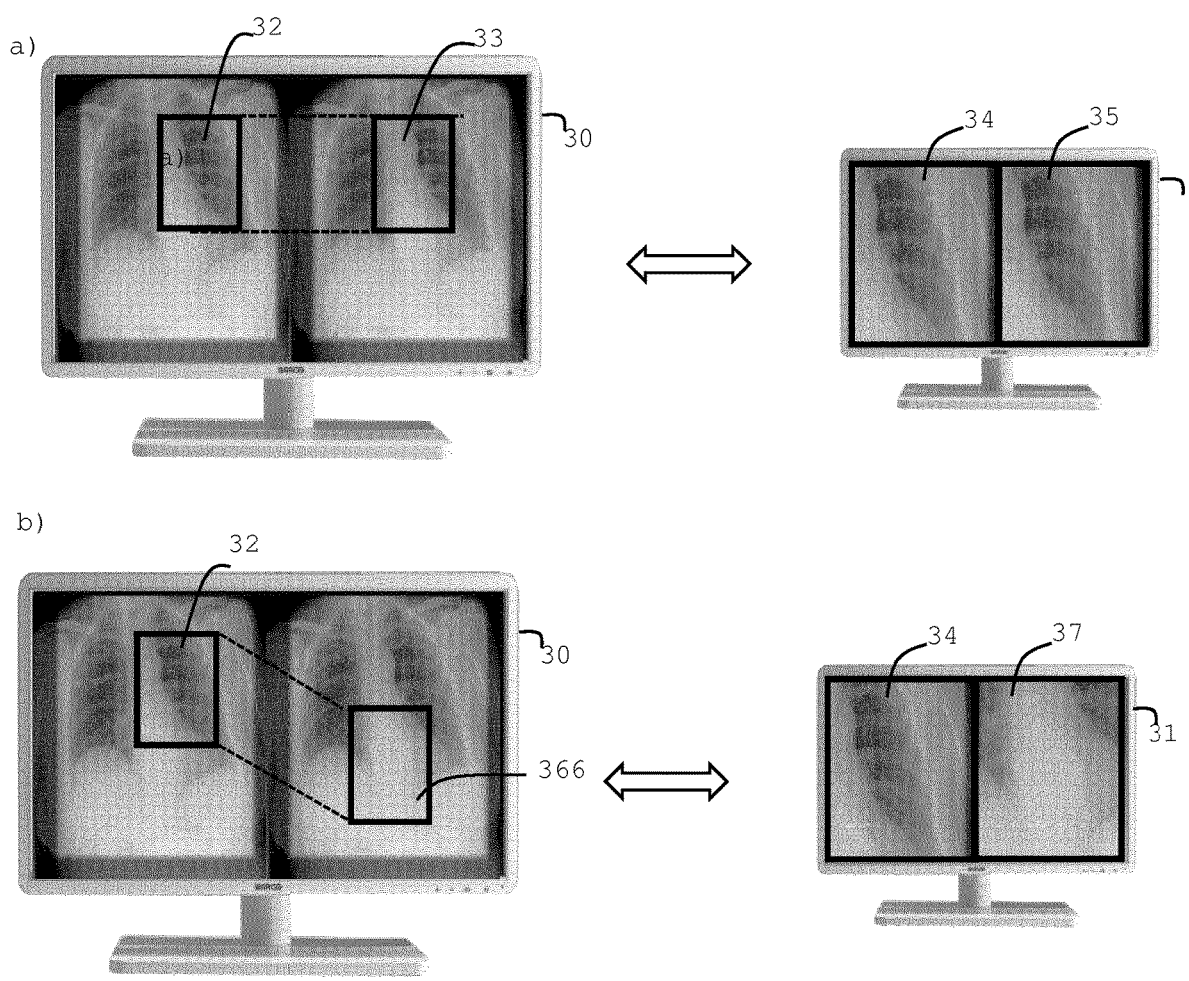
FIG. 4 shows embodiments of the present invention comprising sub-areas of the sharing area.

FIG. 4 shows an embodiment comprising a high-resolution display 30 (host) and an associated display 31 with lower resolution. A hanging protocol of 2×1, i.e. 2 columns and 1 row, is used. The application has assessed the resolution of the image area of the host display 31. In FIG. 4a), two sharing areas 32 and 33 are indicated on display 30 and the corresponding content 34 and 35 is shared unscaled to display 31. In FIG. 4b) the sharing area 33 is replaced by a sharing area 36 at another position. The corresponding content 37 is shown on display 31. For simplicity the control areas have been left out in FIG. 4. The host display can for example be a pathology viewer where one sharing area can be used for an overview and another sharing area can be used for a close-up.

When a multiple of sharing areas are shown on the host display, it is possible to lock them relative to each other in their current positions so that they would behave as if they were "grouped". If one of the sharing areas is then moved (e.g. by grabbing its sharing border with a pointer) all the other sharing areas are moving along automatically, keeping the relative distance between all areas intact. One advantage is that the locked positions can be combined with a hanging protocol so that the user can step through a sequence of related images. FIG. 5 illustrates an embodiment comprising a sequence of scans 40 recorded at time t1 and the same sequence of scans 41 recorded at time t2. The sharing areas 42 and 43 can be compared in a view 46, on another display. Thus 46 can represent the same scan section at two different points in time, and the user can easily step through the whole sequence. By locking the sharing areas to each other, the user can easily step through the corresponding images and compare the same sections at different points in time. The next step would for example be selections 44 and 45, combined to the view 47. The actual content shown will again depend on the resolution of the displays used.

FIG. 6 shows an embodiment of the present invention where the sharing area can be split or merged. In 6a) the sharing area 52 of display 50 is split into subareas 53-56, and in 6b) the subareas are merged into one area 52. This can be managed e.g. via controls in the control area 51 or by a drag-and-drop function using a pointer, or directly on the display in case it is a touchscreen.

The subareas 53-56 maybe distributed over several host displays, e.g. one sub-area per display (not shown). Also the corresponding sharing area on the host display can be equal to one sub-area of the associated display.

Figure 7:
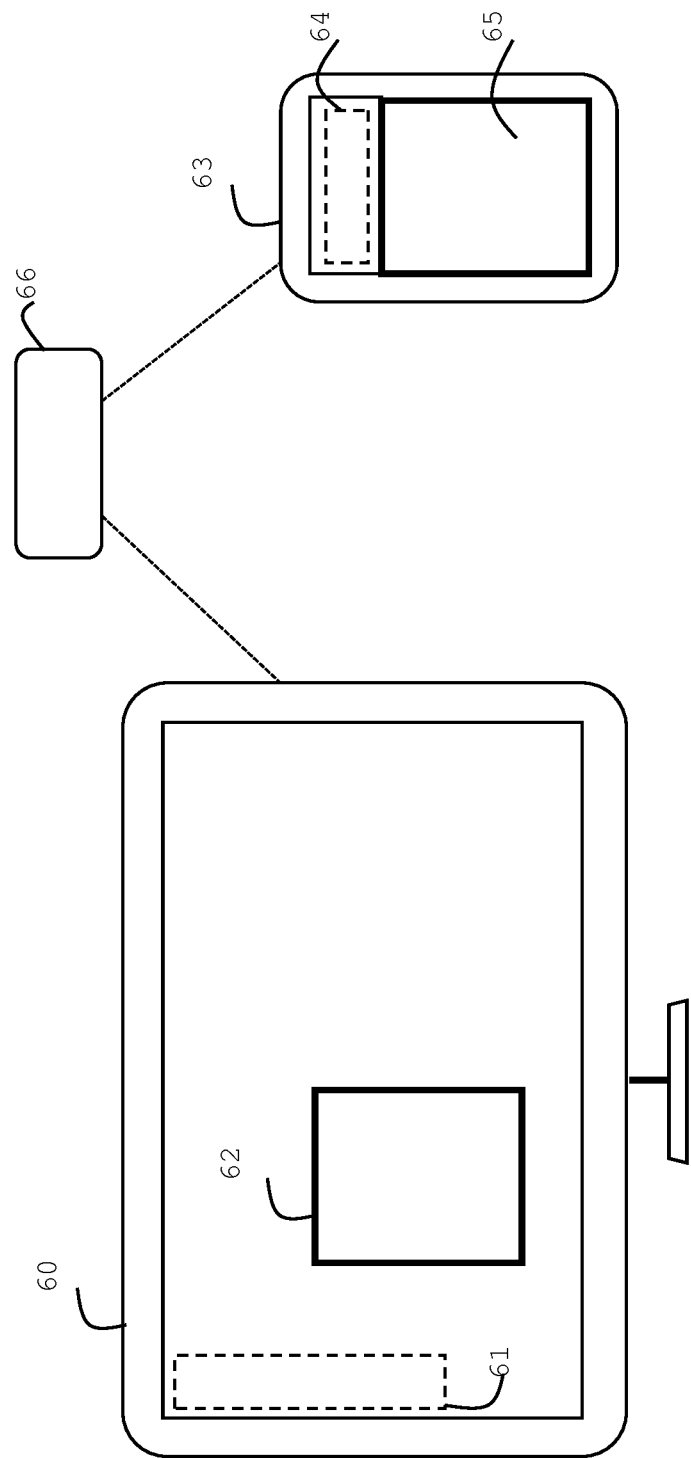
FIG. 7 shows an embodiment of the present invention comprising control areas.

In one embodiment of the invention, the associated display has a control area, as illustrated in FIG. 7. The host display 60 comprises a control area 61 and a sharing area 62, and the associated display 63 comprises a control area 64 and an image area 65. Any operations made on the image area 65 on the associated display, can be reported to the host display so that the shared content can be altered from any device.

In another embodiment the control area 64 of the associated display comprises a special region where the user of the associated display can perform certain operations on the host device, e.g. load or save an image.

Embodiments of the present invention can use a meeting service 66 to communicate between the displays. The meeting service can be implemented on a cloud server, or on a local server in the meeting room or elsewhere in the facility.

In another embodiment of the invention, the host device can be implemented by using a "host workspace". A workspace comprises more than one display and there can be various types of displays. For example, referring to FIG. 3c) where the control area has been put on an associated display 25 that can be of lower resolution. It is also possible that the workspace comprises more than one high-resolution display. Images from all workspace displays (or fewer) can then be shared with an associated display in the same manner as described above.

Figure 8:
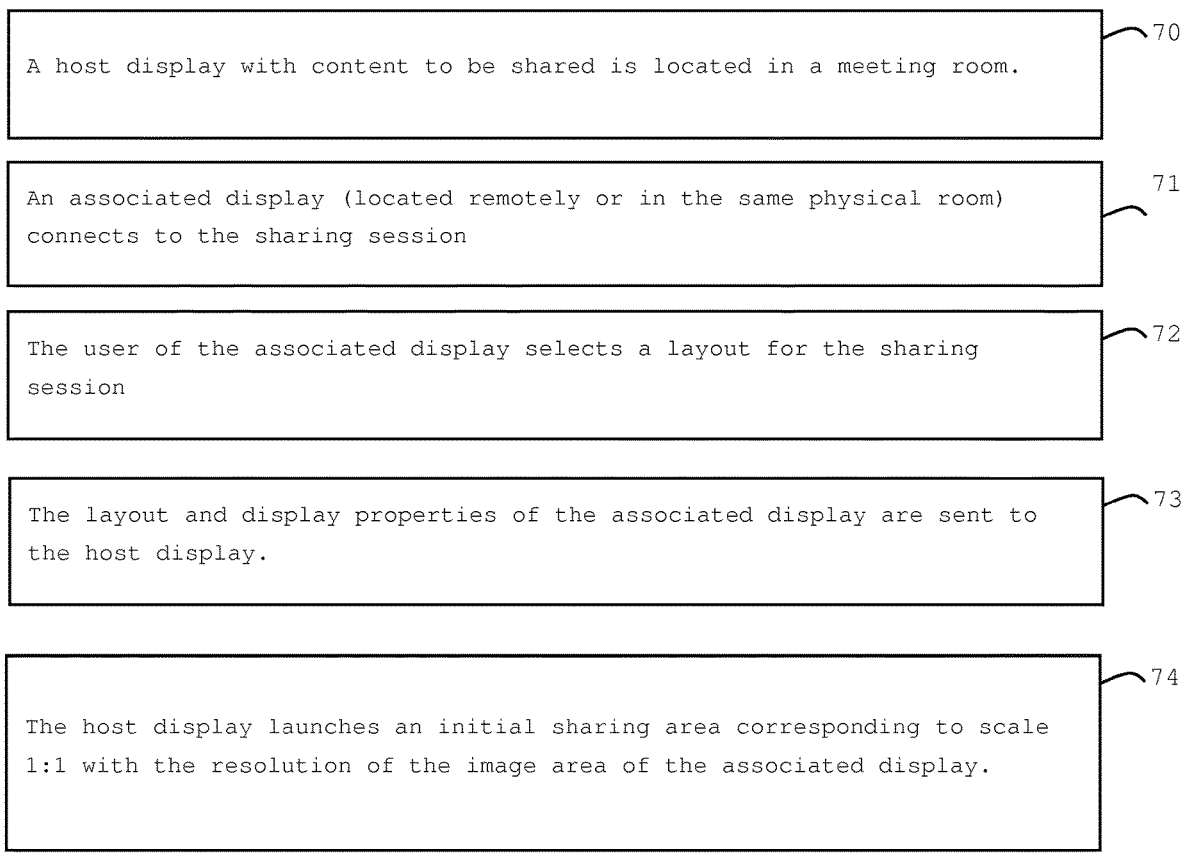
FIG. 8 shows flow chart of an embodiment of the present invention.

FIG. 8 shows a flow chart of an embodiment where the sharing session is initiated. A host display or host displays with content to be shared is located in a meeting room (step 70). An associated display (located in the same physical room or in remote) connects to the sharing session (step 71). The user of an associated display selects a layout for the sharing session (step 72). The layout and display properties of the associated display are sent to the host display (step 73) or to host displays. The host display launches or the host displays each launch an initial sharing area corresponding to scale 1:1 with the resolution of the image area of the associated display. By using predefined layouts the positioning of the sharing- and/or control area(s) on the host display or displays can be automatized. The sharing- and/or control area(s) can be positioned to correspond with only one of a plurality images such as a sub-set of one of the predefined layouts. For example, a sharing area could have N images and a sharing area could coincide with less than N images down to just one image, for example one image of a layout having 2×2 images. It can also be beneficial to use layouts the users are accustomed to. This increases efficiency for the users.

Figure 9:
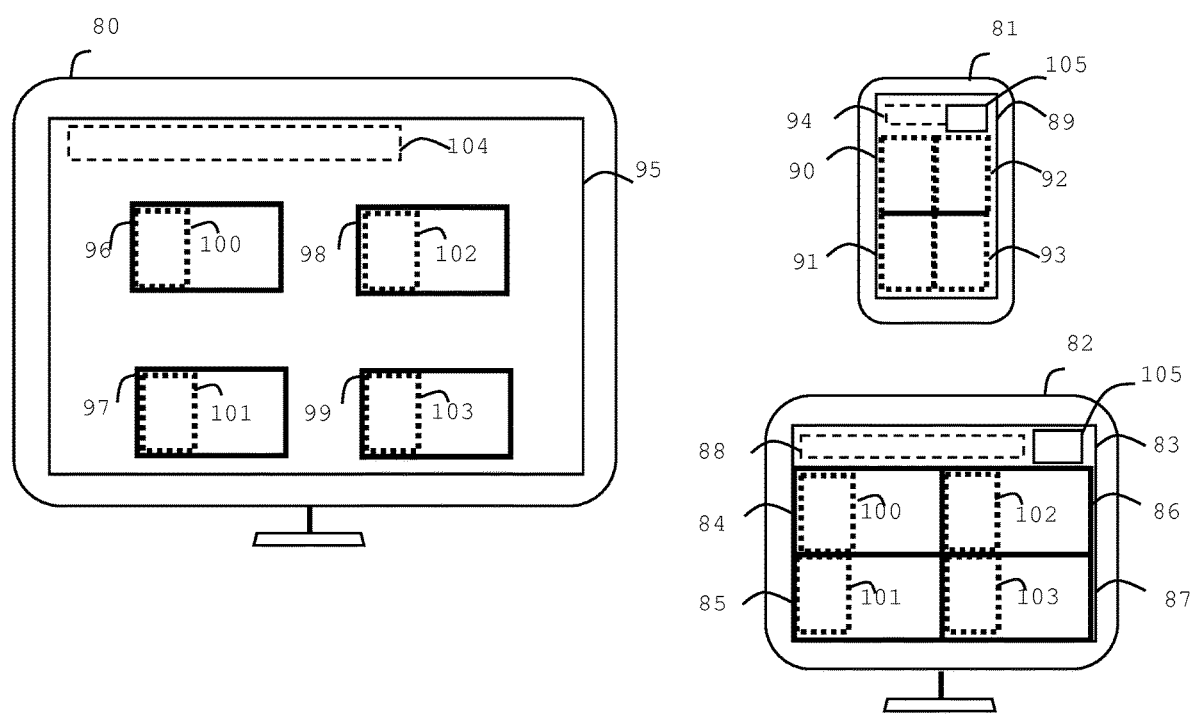
FIG. 9 shows an embodiment of the present invention comprising one host display and two associated displays.

In another embodiment of the present invention the content can be shared to more than one associated display and/or more than one host display. FIG. 9 shows such an example where the content of a (high-resolution) host display 80 is shared with a tablet 81 and an associated display 82 (both with lower resolution than 80). The display area 83 of the associated display 82 comprises the total of image sub-areas 83-86 and a control area 88. The display area 89 of the tablet 81 comprises the total of image sub-areas 90-93 and a control area 94. The display area 95 of host display 80 comprises sharing one or more areas 96-99, or a plurality of host displays have sharing areas which correspond to the image areas 84-87. The display area 95 further comprises one or more sharing areas 100-103, which correspond to image areas 90-93. The areas 100-103 can also be shown on the associated display 82. A corresponding sharing area on the host display can be equal to one sub-area of the associated display as explained below with respect to FIG. 10.

The associated devices 81 and 82 can also receive an interactive thumbnail 105 of the display area of the host display. The thumbnail comprises any content, sharing area and/or control area that might be present on the display area. Additionally the display 81 can also receive a thumbnail of the display area of display 82 (not shown). In this way each user can see what each of the other users see on their displays. Further, the sharing areas in full size or in the thumbnails, can be moved or altered (e.g. scaled) from any display in the sharing session and the outcome is immediately updated to all participating displays. In the present example, the tablet 81 has a smaller area and smaller resolution than the associated display 82, and both 81 and 82 have lower resolution than the host display 80. The smallest sharing areas (here 100-103) will define the content that is shared to everyone in 1:1 resolution.

In case an associated device is of a smaller type (e.g. tablet or mobile phone) and has a very high resolution, the pixel pitch, i.e. the distance between the centres of closest adjacent pixels, can be smaller than for a high-resolution host display or displays of larger conventional size. In such a case the area of an image in 1:1 scale will be smaller on the associated device than on the host display or displays. For special situations it can result in a so small image on the associated device that it will be difficult for the human eye to observe details. In this case it is possible to use "pixel replication" on the associated device, i.e. letting two (or more) pixels on the associated display device represent one pixel of the image on the host display device or devices.

Figure 10:
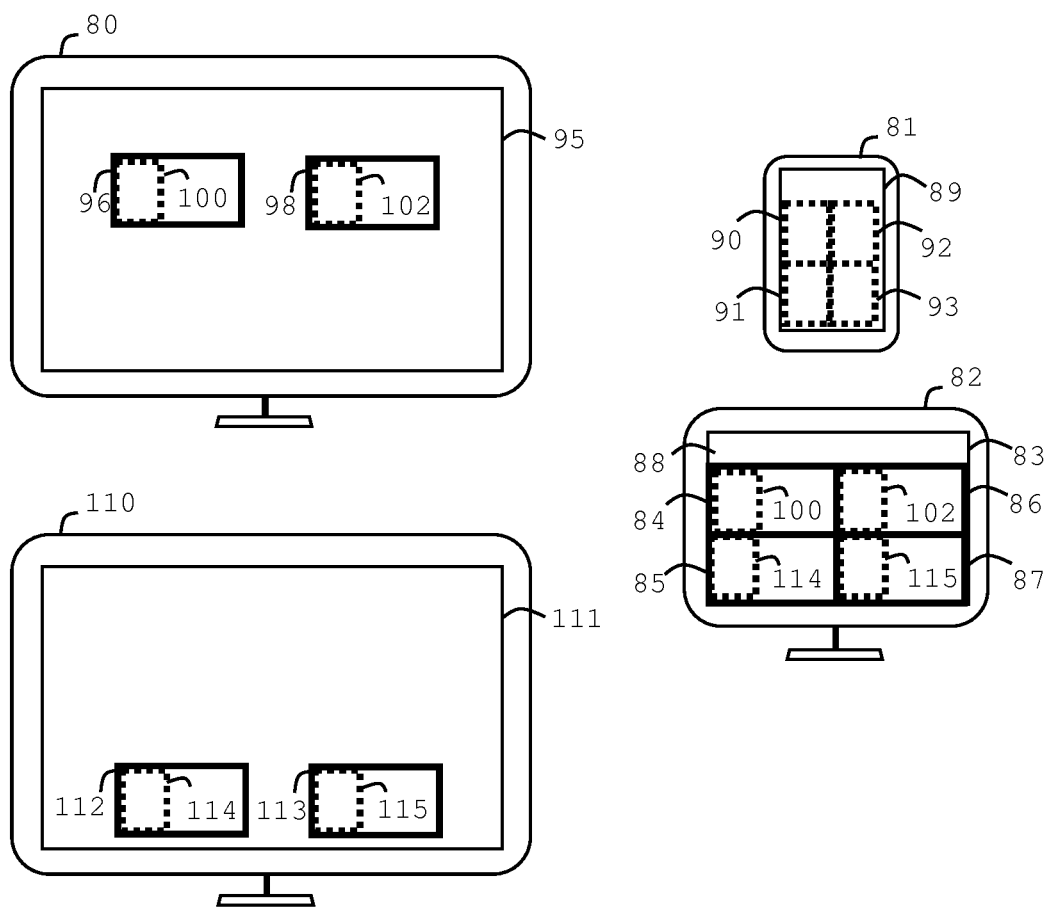
FIG. 10 shows an embodiment of the present invention comprising multiple host displays and an associated display.

In another embodiment of the present invention the content of displays 80 and 110 can be shared to one or more associated displays. FIG. 10 shows such an example where the content of two (high-resolution) host displays 80 and 110 is shared with a tablet 81 and an associated display 82, both with lower resolution than host displays 80 and 110. The display area 83 of display 82 comprises the total of image sub-areas 83-86. The display area 89 of the tablet 81 comprises the total of image sub-areas 90-93. The display area 95 of host display 80 comprises sharing areas 96 and 98, which correspond to the image areas 84 and 86. The display area 111 comprises sharing areas 112 and 113, which correspond to the image areas 85 and 87. The display area 95 further comprises sharing areas 100 and 102, which correspond to image areas 90 and 92. The display area 111 further comprises sharing areas 114 and 115, which correspond to image areas 91 and 93. The areas 100, 102, 114 and 115 can also be shown on the associated display 82. In the present embodiment, the tablet 81 has a smaller area and smaller resolution than the associated display 82, and both tablet and associated display 81 and 82 have lower resolutions than the host display 80. The smallest sharing areas (here 100, 102, 114 and 115) will define the content that is shared to everyone in 1:1 resolution.

The devices 81 and 82 can also receive an interactive thumbnail 105 of the display area of one or each host display 80, 110. The thumbnail comprises any content, sharing area and/or control area that might be present on the display area. Additionally the display 81 can also receive a thumbnail of the display area of display 82 (not shown). In this way each user can see what each of the other users see on their displays. Further, the sharing areas in full size or in the thumbnails, can be moved or altered (e.g. scaled) from any display in the sharing session and the outcome is immediately updated to all participating displays.

In case an associated device is of a smaller type (e.g. tablet or mobile phone) and has a very high resolution, the pixel pitch, i.e. the distance between the centres of closest adjacent pixels, can be smaller than for a high-resolution host display or displays of larger conventional size. In such a case the area of an image in 1:1 scale will be smaller on the associated device than on the host display or displays. For special situations it can result in a so small image on the associated device that it will be difficult for the human eye to observe details. In this case it is possible to use "pixel replication" on the associated device, i.e. letting two (or more) pixels on the associated display device represent one pixel of the image on the host display device or devices.

In accordance with another embodiment of the present invention software may be implemented as a computer program product which has been compiled for a processing engine to carry out any of the methods of the present invention or is compiled to execute in an interpretative virtual machine such as the Java™ Virtual Machine. A display device may comprise logic encoded in media for performing any step of the steps of the methods according to the present invention. Logic may comprise software encoded in a disk or other computer-readable medium and/or instructions encoded in an application specific integrated circuit (ASIC), field programmable gate array (FPGA), or other processor or hardware. A display will also include a CPU and/a GPU and memory, the CPU and/or GPU having a processing engine able to execute software of the present invention.

The computer program product may be stored on a non-transitory signal storage medium such as an optical disk (CD-ROM or DVD-ROM), a digital magnetic tape, a magnetic disk, a solid state memory such as a USB flash memory, a ROM, etc.

The software can be embodied in a computer program product adapted to carry out the following functions when the software is loaded onto the respective display or displays and executed on one or more processing engines such as microprocessors, ASIC's, FPGA's etc.:

sharing content between one host display and at least one associated display, each display having an image area.

The software can be embodied in a computer program product adapted to carry out the following functions when the software is loaded onto the respective device or devices and executed on one or more processing engines such as microprocessors, ASIC's, FPGA's etc.:

for each associated display, the host display receiving the resolution of an image area of the associated display and defining a sharing area on the host display having the same resolution, and displaying the unscaled content in the sharing area of the host display on the image area of the associated display.

The software can be embodied in a computer program product adapted to carry out the following functions when the software is loaded onto the respective device or devices and executed on one or more processing engines such as microprocessors, ASIC's, FPGA's etc.:

adding a sharing border to each sharing area, indicating to which associated display it refers to; and/or for at least one associated display, making the corresponding sharing area on the host display equal to one sub-area of the associated display or dividing the corresponding sharing area on the host display into sharing sub-areas where the total area of all sharing sub-areas equals the image area of the associated display;

and/or for at least one associated display, making corresponding sharing areas of a plurality of host displays into sharing sub-areas of the at least one associated display wherein the total area of all the sharing sub-areas equals the image area of the associated display, and/or each display displaying the sharing borders from displays with the same resolution or lower.

The software can be embodied in a computer program product adapted to carry out the following functions when the software is loaded onto the respective device or devices and executed on one or more processing engines such as microprocessors, ASIC's, FPGA's etc.:

the display area of at least one associated display receiving a thumbnail of the display area of the host display, or a thumbnail of the display area of the host display and a thumbnail of the display area of at least one other associated display; and/or moving or altering a sharing area being located outside or inside a thumbnail on any display.

The software can be embodied in a computer program product adapted to carry out the following functions when the software is loaded onto the respective device or devices and executed on one or more processing engines such as microprocessors, ASIC's, FPGA's etc.:

moving or altering comprises grabbing a sharing border with a pointer and move it over the screen or scale it, or pushing a sharing border with the pointer in a certain direction; and/or positioning the sharing sub-areas immediately adjacent to each other on the corresponding associated display; and/or positioning the sharing sub-areas at arbitrary positions on the host display area.

The software can be embodied in a computer program product adapted to carry out the following functions when the software is loaded onto the respective device or devices and executed on one or more processing engines such as microprocessors, ASIC's, FPGA's etc.:

allocating a control area on for control functions on the display area of the host display and on at least one associated display, and using the control areas for sharing at least one control function of the host display with the at least one associated display; and/or arranging the content of the host display in a predefined layout.

The software can be embodied in a computer program product adapted to carry out the following functions when the software is loaded onto the respective device or devices and executed on one or more processing engines such as microprocessors, ASIC's, FPGA's etc.:

launching the sharing session and automatically arranging the at least one sharing area and/or the control area of the host display according to predefined layout; and/or launching the sharing session and manually or automatically positioning the at least one sharing area and/or the control area of the host display according to at least one sub-set of the predefined layout.

The software can be embodied in a computer program product adapted to carry out the following functions when the software is loaded onto the respective device or devices and executed on one or more processing engines such as microprocessors, ASIC's, FPGA's etc.:

locking at least two selected sharing sub-areas on the host display relative to each other and moving them synchronized, and showing their contents side by side on the corresponding associated display.

The software can be embodied in a computer program product adapted to carry out the following functions when the software is loaded onto the respective device or devices and executed on one or more processing engines such as microprocessors, ASIC's, FPGA's etc.:

receiving input to the display area of any display, altering any sharing or control area, for example splitting a sharing area or to merge at least two sharing sub-areas or scaling a sharing or control area, or add labels or annotations to the shared content, or any combinations hereof, and updating the outcome to all other displays.

The software can be embodied in a computer program product adapted to carry out the following functions when the software is loaded onto the respective device or devices and executed on one or more processing engines such as microprocessors, ASIC's, FPGA's etc.:

personalizing the pointer of any display, for example, adding a colour and/or a label for each user; and/or representing one pixel on the host display by two or more pixels on the associated display.

The software mentioned above can be stored on a non-transitory signal storage medium, such as an optical disk (CD-ROM or DVD-ROM); a magnetic tape, a magnetic disk, a ROM, or a solid state memory such as a USB flash memory or similar.

The invention claimed is:

1. A method for sharing content between at least one host display and a plurality of associated displays, each at least one host display and each associated display of the plurality of associated displays having an image area and each image area having a resolution, the method comprising, for a first associated display of the plurality of associated displays and a second associated display of the plurality of associated displays, the following steps:

the at least one host display receiving the resolution of a first image area of the first associated display;

defining on the image area of the at least one host display at least one first corresponding sharing area which has the same resolution as the first image area of the first associated display and the host display displaying an image content in the at least one first corresponding sharing area, and defining on the image area of the at least one host display at least one second corresponding sharing area;

sharing the content of the at least one first corresponding sharing area of the at least one host display which is displayed on the at least one host display as first shared unsealed content to the first associated display, and sharing content of the at least one second corresponding sharing area of the at least one host display as second shared content to the second associated display;

displaying the first shared unsealed content on the first image area of the first associated display, and displaying the second shared content on the second image area of the second associated display, wherein the displaying step comprises making at least one first image sub-area on the first associated display and at least one corresponding first sharing sub-area on the at least one host display, and making at least one second image sub-area on the second associated display and making at least one corresponding second sharing sub-area within the first sharing sub-area on the at least one host display and within the first image sub-area of the first associated display, and wherein, for the at least one host display and each associated display of the plurality of associated displays having different resolutions, the smallest sharing areas define image content that is shared to the image area of every display in 1:1 resolution.

2. The method according to claim 1, comprising adding a sharing border to each sharing area and each sharing sub-area, indicating to which at least one associated display it refers to.

3. The method according to claim 2, comprising each display displaying sharing borders from displays with the same resolution or lower.

4. The method according to claim 1, comprising for at least one associated display of the plurality of associated displays, making a corresponding sharing area on at least one host display equal to one image sub-area of the at least one associated display.

5. The method according to claim 1 comprising the image area of at least one associated display of the plurality of associated displays receiving a thumbnail of the image area of at least one host display, or a thumbnail of the image area of the at least one host display and a thumbnail of the image area of at least one other associated display of the plurality of associated displays.

6. The method according to claim 5 comprising moving or altering a sharing area being located outside or inside a thumbnail on any display.

7. The method according to claim 6 wherein the moving or altering comprises grabbing a sharing border with a pointer and move it over the screen or scale it, or pushing a sharing border with the pointer in a certain direction.

8. The method according to claim 1 further comprising positioning sharing sub-areas, wherein the positioning is selected from: immediately adjacent to each other on the corresponding at least one associated display, and at arbitrary positions on the image area of at least one host display.

9. The method according to claim 1 comprising allocating a control area on a display area of at least one host display and on at least one associated display for control functions, and using the control areas for sharing at least one control function of the at least one host display with the at least one associated display.

10. The method according to claim 9 comprising launching a sharing session and manually or automatically positioning at least one sharing area and/or control area of the at least one host display according to at least one sub-set of predefined layouts.

11. The method according to claim 1 comprising locking at least two selected sharing sub-areas on the at least one host display relative to each other and moving them synchronized, and showing their contents side by side on the at least one associated display.

12. A computer program product comprising software which when executed on one or more processing engines, performs the method of claim 1, wherein the computer program product is stored on a computer readable non-transitory signal storage medium.

13. The method according to claim 1, wherein the at least one host display has a higher resolution than at least one associated display of the plurality of associated displays.

14. The method according to claim 1, further comprising the step of launching a sharing area on the at least one host display, which sharing area has content, and capturing the content in the sharing area of the at least one host display.

15. The method according to claim 1, wherein at least one second corresponding sharing area has the same resolution; wherein the sharing content of the at least one second corresponding sharing area of the at least one host display is shared as second shared unscaled content to the second associated display; and wherein the displaying of the second shared content on the second image area of the second associated display displays the second shared unscaled content.

16. A system for sharing content between at least one host display and a plurality of associated displays, the at least one host display and each associated display of the plurality of associated displays having an image area and each image area having a resolution, wherein for a first associated display of the plurality of associated displays and a second associated display of the plurality of associated displays, the system comprising:
the at least one host display being configured to:
receive the resolution of the first image area of the first associated display; and
define on the image area of the at least one host display at least one first corresponding sharing area which has the same resolution as the first image area of the first associated display and the host display displaying an image content in the at least one first corresponding sharing area, and define on the image area of the at least one host display at least one second corresponding sharing area;
the system being configured to share the content of the at least one first corresponding sharing area of the at least one host display which is displayed on the at least one host display as first shared unsealed content to the first associated display; and share content of the at least one second corresponding sharing area of the at least one host display as second shared content to the second associated display;
the first associated display being configured to display the first shared unsealed content on the first image area; and
the second associated display being configured to display the second shared content on the second image area,
wherein the displaying comprises making at least one first image sub-area on the first associated display and at least one corresponding first sharing sub-area on the at least one host display, and making at least one second image sub-area on the second associated display and making at least one corresponding second sharing sub-area within the first sharing sub-area on the at least one host display and within the first image sub-area of the first associated display, and
wherein, for the at least one host display and each associated display of the plurality of associated displays having different resolutions, the smallest sharing areas define image content that is shared to the image area of every display in 1:1 resolution.

17. The system according to claim 16, wherein each sharing area and each sharing sub-area has a sharing border, indicating to which associated display it refers to.

18. The system according to claim 16, wherein for at least one associated display of the plurality of associated displays, the corresponding sharing area on the at least one host display is equal to one sub-area of the associated display or the corresponding sharing area on the host display being divided into sharing sub-areas so that the total area of all sharing sub-areas equals the image area of the associated display.

19. The system according to claim 16, wherein the image area of at least one associated display comprises a thumbnail of the image area of at least one host display, or a thumbnail of the image area of at least one host display and a thumbnail of the image area of at least one other associated display.

20. The system according to claim 16, wherein the at least one host display is distributed over two physical display monitors.

21. The system according to claim 16, wherein an image area and a control area are located in separate streams.

* * * * *